United States Patent [19]
Rawson et al.

[11] 3,984,923
[45] Oct. 12, 1976

[54] SYSTEM AND PROCESS FOR PRESCHOOL SCREENING OF CHILDREN

[75] Inventors: Edward B. Rawson, Lincoln; Bernard Krasnick, Wayland; Theodore Schaefer, Jr., Newtonville, all of Mass.

[73] Assignee: Searle Medidata, Inc., Lexington, Mass.

[22] Filed: Sept. 6, 1974

[21] Appl. No.: 503,782

[52] U.S. Cl. .................................. 35/9 A; 35/9 B; 351/1
[51] Int. Cl.² ........................................ G09B 7/04
[58] Field of Search .................... 35/9 A, 9 B, 22 R; 351/1, 39

[56] References Cited
UNITED STATES PATENTS

| | | | |
|---|---|---|---|
| 2,983,053 | 5/1961 | Bartholomew et al. | 35/9 B |
| 3,107,440 | 10/1963 | Lovering | 35/22 R |
| 3,382,588 | 5/1968 | Serrell et al. | 35/9 A |
| 3,566,375 | 2/1971 | Schultz | 340/174 |
| 3,584,396 | 6/1971 | Hannah et al. | 35/9 A |
| 3,590,497 | 7/1971 | Darby | 35/9 A |
| 3,623,238 | 11/1971 | Laplume et al. | 35/9 A |
| 3,660,912 | 5/1972 | Laplume | 35/9 A |
| 3,664,037 | 5/1972 | Budnik et al. | 35/9 A |

Primary Examiner—William H. Grieb
Attorney, Agent, or Firm—Walter C. Ramm; Peter J. Sgarbossa; John J. Kolano

[57] ABSTRACT

A system for preschool screening of children through a series of question and answer routines presented via an audiovisual console. The console has a slide display of graphic information and an audio instruction to the child typically to select one of a plurality of figures displayed by activation of a corresponding, adjacent button. Additionally, the child may be asked to count a predetermined number through button activations, to respond to the visual display through selected lenses in a hood for vision testing, or to receive audio instructions through a set of earphones which are selectively attenuated in earphone volume to determine hearing acuity. The screening system has a logic control operative in response to coded instructions which are stored in a set of registers from a magnetic tape system. The magnetic tape system also provides the control of audio and visual information for an entire series of tests. The logic control is designed to take special cognizance of characteristics of the youthful child operator in responding to his or her particular button pushes or lack thereof, and to provide an indication of the answer sequence to the magnetic tape system for recording on an answer tape in association with a series of coded comments which may be entered by an adult supervisor.

14 Claims, 16 Drawing Figures

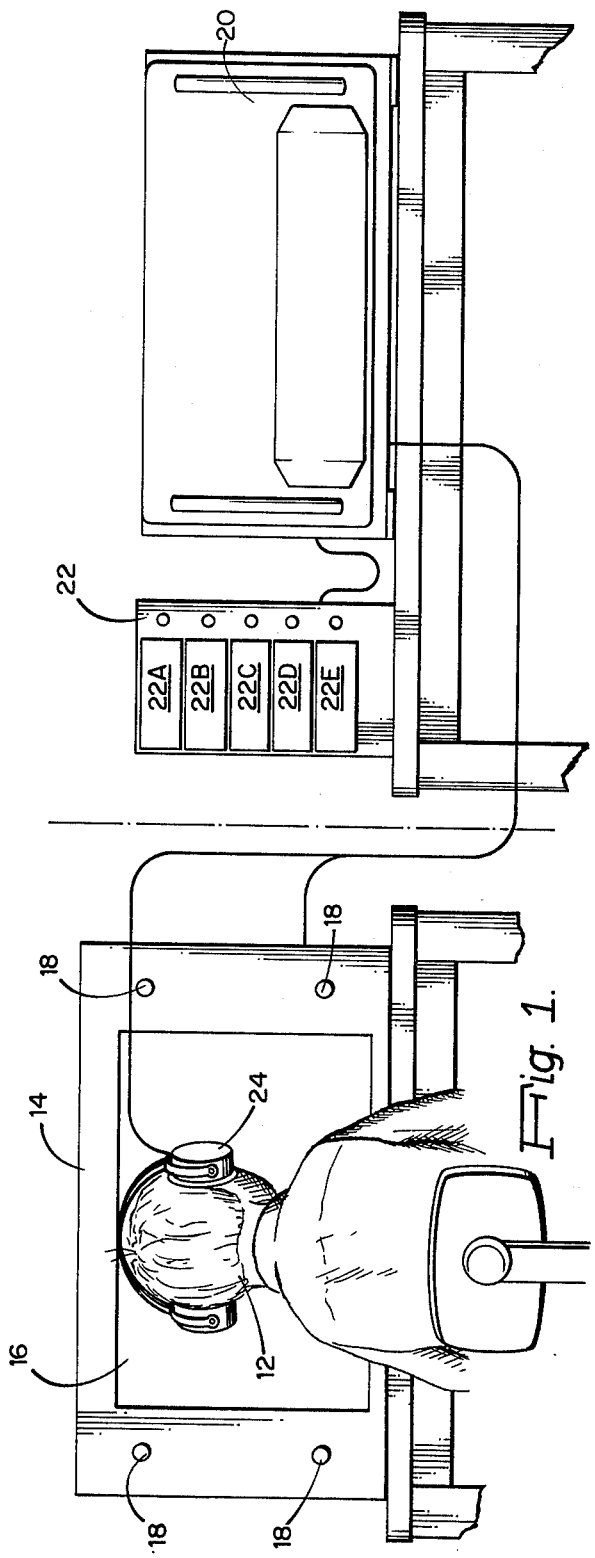
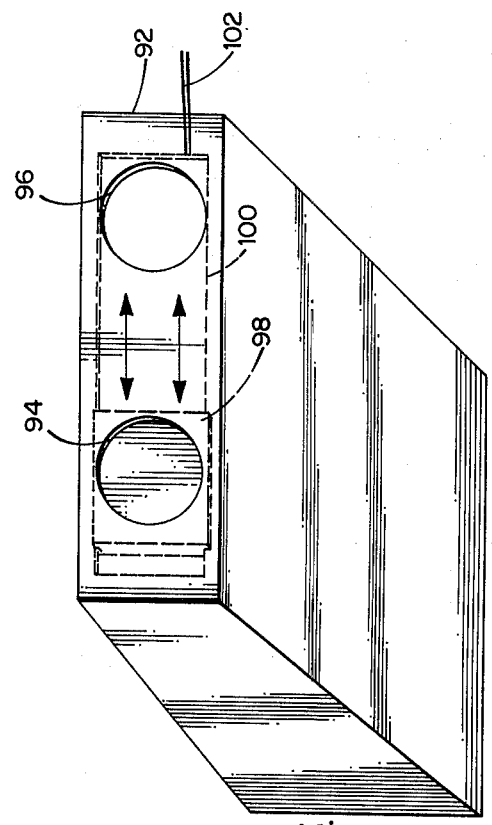

COMMENT MSG

| STX |
|---|

| ASCII NUMERIC | COMMENT NO. IN SEQ.

| |
|---|

| P | 1 | LO | ⎫
|---|---|---|
| P | 1 | HI | ⎬ QUESTION NO., REGIS. B
                    ⎭

| ETX |
|---|

*Fig. 10.*

JUMP MSG

| STX |
|---|

| ASCII J |
|---|

| |
|---|

| P | 1 | LO | ⎫
|---|---|---|
| P | 1 | HI | ⎬ QUESTION NO., REGIS. B
                    ⎭

| ETX |
|---|

*Fig. 11.*

OP RESET MSG

| STX |
|---|

| ASCII M |
|---|

| |
|---|

| P | 1 | LO | ⎫
|---|---|---|
| P | 1 | HI | ⎬ QUESTION NO., REGIS. B
                    ⎭

| ETX |
|---|

*Fig. 12.*

SYSTEM AND PROCESS FOR PRESCHOOL SCREENING OF CHILDREN

FIELD OF THE INVENTION

This invention relates to automated testing and in particular to a system and process for intelligence, readiness, learning ability, vision and hearing testing of preschool children.

BACKGROUND OF THE INVENTION

It is well recognized that mental or physical disorders in the preschool child can often prevent the child's normal educational development throughout his school years. Corrective measures are known for many of these disorders and becoming increasingly available whereby the problem, once detected, may be partially or wholly compensated by special education programs or otherwise. Thus, it becomes increasingly important to provide a system for early detection of such difficulties in the child so that corrective measures may be started.

Also, the readiness of a child to undertake a particular level of basic schoolwork is an important parameter to know in advance so that the child receives the most appropriate initial schooling. Readiness is not necessarily a function of age, but is affected by social and cultural background, as well as the child's basic talents.

Heretofore, the common means for evaluating child readiness and for detecting these disorders, or at least detecting the probability of their presence in a given child, was to have a highly trained adult testing specialist administer to each child a lengthy set of intelligence and physical tests aimed at evaluating the psychological and intellectual capabilities of each child. In such a situation, it is important to maintain as uniform a test climate as is possible from child to child in order that there be no bias in the answers reflecting the individual administration of each test. It is thus important that the test administrator be highly skilled in child psychology, as well as the particular characteristics of the test being administered. In addition, and to complete the analysis of the preschool child, the family pediatrician may be asked to evaluate specific hearing and vision characteristics of the child, or a further set of special tests are administered by screening specialists to determine the existence of hearing or vision difficulties. The use of such highly trained personnel for a lengthy set of tests on each child becomes an expensive but necessary process if each child is to fully benefit from his education.

Where heretofore machine, automated testing systems have been extensively used for adult screening to reduce the cost of test administration, the use of such automated testing systems with the preschool child has been limited by the less developed understanding and reasoning ability of the child.

BRIEF SUMMARY OF THE INVENTION

In accordance with a preferred embodiment for the present invention, a system having an audio-visual console is provided for the screening of preschool children in order to identify potential mental or physical disorders in the child before years of attempted education have been wasted, and his development set back irreversibly and to identify child readiness. The audio-visual console provides for the automatic presentation of a series of tests to the child, each test typically comprising a series of slides projected onto a viewing screen and accompanied by audio instructions which direct the child to press one of a plurality of answer buttons in accordance with the visual information displayed. The audio-visual console is controlled by a digital system which, in turn, receives its instructions from a set of magnetic tapes. The magnetic tapes contain control data which is read into a plurality of storage registers in the digital system in sets of messages, each message corresponding to a question, so that the characteristics of the console in responding to the child's actions or non-actions can be adjusted from question to question. The tapes also contain audio instructions which are directed through an audio system to earphones placed on the child.

The digital system in cooperation with the digital instructions received from the test tapes is particularly flexible to permit individually programmed compensation for the likely patterns of abnormal response of the preschool test taker, such as confusion or incorrect answers. The test format is also provided with standardized types of questions and answers within the preschool child's capability. Simple multiple-choice picture questions are presented with answers selected by activation of associated, adjacent buttons placed around the displayed image. Questions which involve a counting answer indicated by the depression of the answer buttons a selected number of times are also employed. In addition, the system is adapted to recognize child confusion from a failure of the child to respond to a question. In such circumstances, the system can be operated to step to the next question, or to provide the child with an audio encouragement to answer the question. In the case of answers, the system can be programmed to detect the predetermined number of wrong answers within a further predetermined number of consecutive questions to result in an abortion of the test because of obvious child incapacity to respond properly. The criteria for test abortion can be similarly varied by data in the message associated with each answer. Also, in the case where a wrong answer is given, the system can be made operative or not as desired to indicate to the child the correct answer through illumination of the button which should have been depressed. This helps to guide the child into the correct use of the console if he is initially confused. The child's wrong answers and corresponding question numbers are recorded on a separate magnetic tape along with marker signals which mark specific events in the administration of the test and which a test system supervisor can trigger from a supervising console. These marker signals may then be keyed to explanations which the supervisor may write on a separate comment sheet.

The system flexibility also permits ease of administration of vision and hearing tests. In the case of vision, a special hood is applied over the viewing screen so that the child views the display through separate lenses which provide the equivalent of a preset focal length. Shutters are actuatable to block vision through either lens in response to data provided from the test tape to the storage registers in the digital system so that each eye can be separately tested. In addition, during the audio or hearing test, the audio level applied to each of the right- and left-hand earphones is separately programmed, again in response to digital information read into the storage registers from the test tapes so that threshold hearing sensitivity and total response characteristics of the child's ears can be individually measured.

BRIEF DESCRIPTION OF THE DRAWINGS

These and other features of the present invention will be more fully described below in the detailed description of the preferred embodiment, presented for purposes of illustration and not by way of limitation, and in the accompanying drawings of which:

FIG. 1 is a pictorial view of a console and control system for child testing in accordance with the invention;

FIG. 3 is a pictorial view of a vision testing hood for use on the FIG. 1 console;

FIGS. 6–12 are diagrams of output data message formats used in the invention;

DETAILED DESCRIPTION OF THE PREFERRED EMBODIMENT

Figure 2:
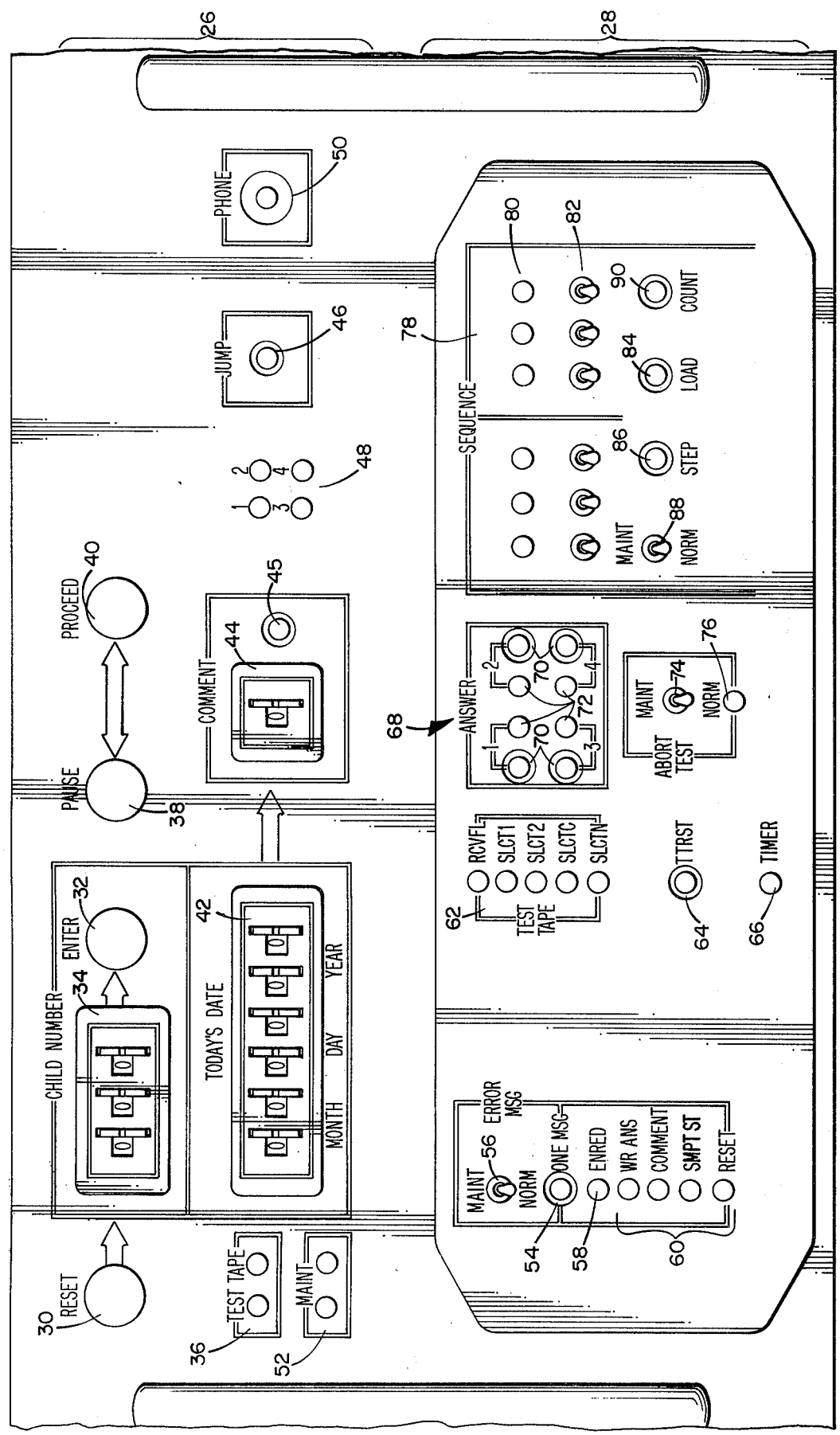
FIG. 2 is a pictorial front panel view of the control system of FIG. 1.

The present invention contemplates a system and process for preschool screening of children to evaluate child readiness for school instruction and to detect physical and mental characteristics which, without correction, could impair later child development in the school environment. While the exemplary description presented below represents a preferred form for practicing the present invention, it is to be noted that other forms can be developed within the spirit of the invention.

For a description of this preferred embodiment, reference is made to the figures, including FIG. 1, which shows a pictorial view of the system of the present invention. A console operator 12, typically a preschool child, is seated before a display console 14 having a display screen 16 and four buttons 18, each associated with one of the four quadrants of the display screen 16. The console 14 includes a projector such as the random access Kodak Carousel projector model RA 960, controlled by a central control system 20 in conjunction with a record medium comprising a five-tape tape reader/recorder system 22. The console 14 may be generally similar to the unit described in U.S. Pat. No. 3,566,375, incorporated herein by reference and assigned to the same assignee as the present invention.

The tape system 22 includes five standard cartridge tape decks and five corresponding tapes 22A, 22B, 22C, 22D and 22E. The control circuitry for the tapes is described below. Typically, the tapes 22A and 22B are each test tapes containing digital and audio recordings for the sequences of tests to be administered to the child. Two tapes are employed rather than one in the preferred embodiment so that while one tape is being read through each question in a test series, the other tape can be advanced to the beginning of the next test series to prevent a delay in starting the next test in the event that the test being administered has to be aborted. No delay is then required in the commencement of the next test series. The data and audio on tapes 22A and B may be similar to standard child testing questions. The tapes 22C and 22D are respectively designated "neutral" and "correction" statement tapes and have a plurality of the same messages recorded thereon so that a selected message may be played to the child on command by the system without rewind. The neutral statement tape 22C contains an encouragement to the child and is used when a predetermined period of time elapses before the child answers. The effect of the statement is to encourage the child to at least try one answer. The correction statement on tape 22D indicates to the child that he has answered the question wrong and that the button corresponding to the right answer which should have been pushed will be illuminated to show the correct answer. The tape 22E is the answer and error tape onto which recording is done and it contains digital representations of child errors and other messages indicative of the child's progress through the series of tests and individual questions.

The child wears a set of earphones 24 which are also connected to the control system 20 for receiving audio information from selected tapes in the tape reader/recorder 22.

The control system 20 has a control panel as shown in FIG. 2 with associated controls and indicators which may be described for purposes of introducing the operation of the system of the present invention, although their specific operative connection within the system of the present invention will be described in detail below. In particular, in FIG. 2, there is shown a top portion 26 of controls normally used by the adult test administrator, as well as a lower section 28 of controls and indicators which are normally kept hidden beneath a cover plate not shown. In the top portion 26, a reset indicator-button 30 may be pushed to provide rewinding of source tapes in the tape system 22. System electrical reset is typically automatic as described below. The illumination of the indicator button 30 indicates that the system is being reset, and extinguishing of light 30 and illumination of an enter indicator-button 32 indicates that reset has been achieved. A three-wheel thumbwheel switch 34 permits entry of a child identification number. A two-bit error indicator light 36 is illuminated to indicate an excessive error rate on the test tapes necessitating their replacement for proper operation. A pause button 38 may be activated in the test sequence to hold processing. Once the enter indicator-button 32 is pushed and the data entered, the pause indicator-button 38 is illuminated. When the proceed indicator-button 40 is pushed, it is illuminated and the system begins operation. Normally, at the beginning of the test, before the activation of the enter button 32, a thumbwheel switch system 42 for entering the day's date is set to the appropriate day. Additionally, a comment thumbwheel switch 44 is manually reset to the number zero. A comment button 45 is depressed by the supervisor whenever he wishes to provide a comment indication onto the answer recording tape 22E to correlate it to a handwritten comment. This may occur at any time during the test. Digital information indicating the numerical value of the comment switch 44 will be entered on the answer tape at that point. Switch 44 is then advanced. Stepping of the system to the next test is manually produced by activation of a jump button 46.

A set of four lights 48 indicates the status of a button register within the control system 20 indicative of the button which the child has depressed. A phone jack 50 is provided so that an operator's earphones may be plugged in to monitor the audio information from the system. A maintenance indicator 52 indicates whether the system is in a normal or maintenance mode in response to activation of a switch in the portion 28.

In the portion 28, an error message region contains a switch 56 which may be placed in the maintenance as opposed to normal condition to provide read-out of an internal queue register which contains system condition data ready for application to the answer tape 22E. A further light 58 flashes when the answer tape is being recorded on. A button 54 permits one message at a time to be recorded on the answer tape in the maintenance condition. A further set of four lights 60 responds to specific queue register bits indicating messages to be recorded on the answer tape. The four lights respectively indicate a wrong answer, a comment entry, a jump entry, and a manual reset entry.

A set of test tape lights 62 indicates certain test tape conditions and responds to the state of flip-flops of the same designation in the control circuitry described below. A button 64 resets test tape lights 36. A light 66 blinks at a one-second interval in response to a counter within the circuitry to be described below so that the counter operation can be monitored. A set of answer lights 68 has four buttons shown at 70 that correspond to buttons 18 on the child's console and four lights 72 to display the correct answer as provided from the circuitry. A switch 74 disables the test abort function to be described below and a light 76 associated with the switch indicates when a test abort and corresponding jump to a subsequent test would normally have taken place.

A sequence indicator section 78 has a top row of six lights 80 which indicate in octal notation the particular state in the answer monitoring sequence at which the system is operating. Switches 82 permit selection of any state. Button 84 loads the state register from switches 82 and count button 90 advances the state by one. Step button 86 advances the sequence one step at a time. Switch 88 enables the function of section 78.

With reference now to FIG. 3, there is shown a vision testing hood 92 which is slipped over the console 14 in front of the child's eyes so that he must view the screen 16 through first and second, left- and right-hand lenses 94 and 96 which correct the viewing distance to a predetermined child to screen distance. Each lens 94 and 96 is selectively blocked by a shutter 98 in a shutter mechanism 100. The shutter mechanism 100 is electrically operated through a cable 102 from the control system 20 as will be described below. Shutter 98 is controlled for selective obstruction of lens 94 or 96 in response to the signals on line 102.

Figure 4:
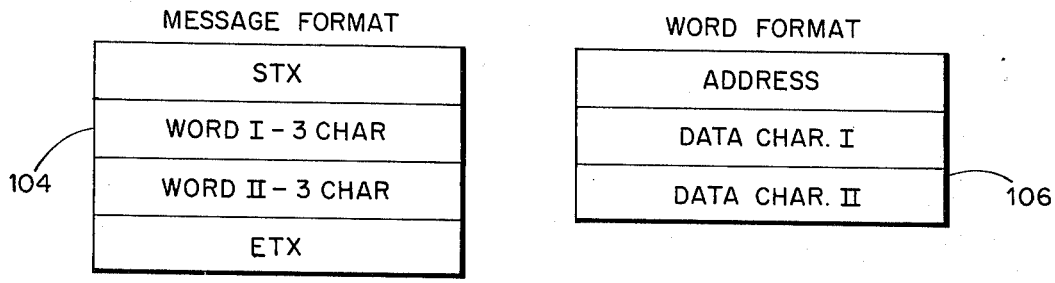
FIG. 4 is a diagram of data message and word formats used in the invention.

Referring now to FIG. 4, the basic word format recorded on tapes 22A and 22B as binary signals is indicated. Typically, audio signals will be recorded for each test on the same tape with the digital message. For digital information, a message 104 is composed of eight characters in ASCII and includes an STX character followed by three characters of a first word and three characters of a second word and concluded with the ETX designation. Each word format 106 is shown to include an address character followed by a first data character and a second data character.

The particular functions employed in the present invention are specified from data in seven different word types designated by the letters A–G. Each word type corresponds to a specific register in the control circuitry which is loaded with a word of the corresponding type from the tapes 22A or 22B. These are shown in detail in FIG. 5. Each word has an address character and two data characters. Each bit of the data characters has special significance for controlling one or more functions of the screening system. The address character consists of eight bits designating the word type A–G and is detected to direct each word from the tapes employed in the system to one of the seven corresponding registers. Accordingly, the designations in FIG. 5 can be viewed as a description of the registers themselves, as well as the words. Of the eight bits in each character, the last is employed as a parity bit and the next to last is unused and accordingly always set to the same predetermined state.

Figure 5:
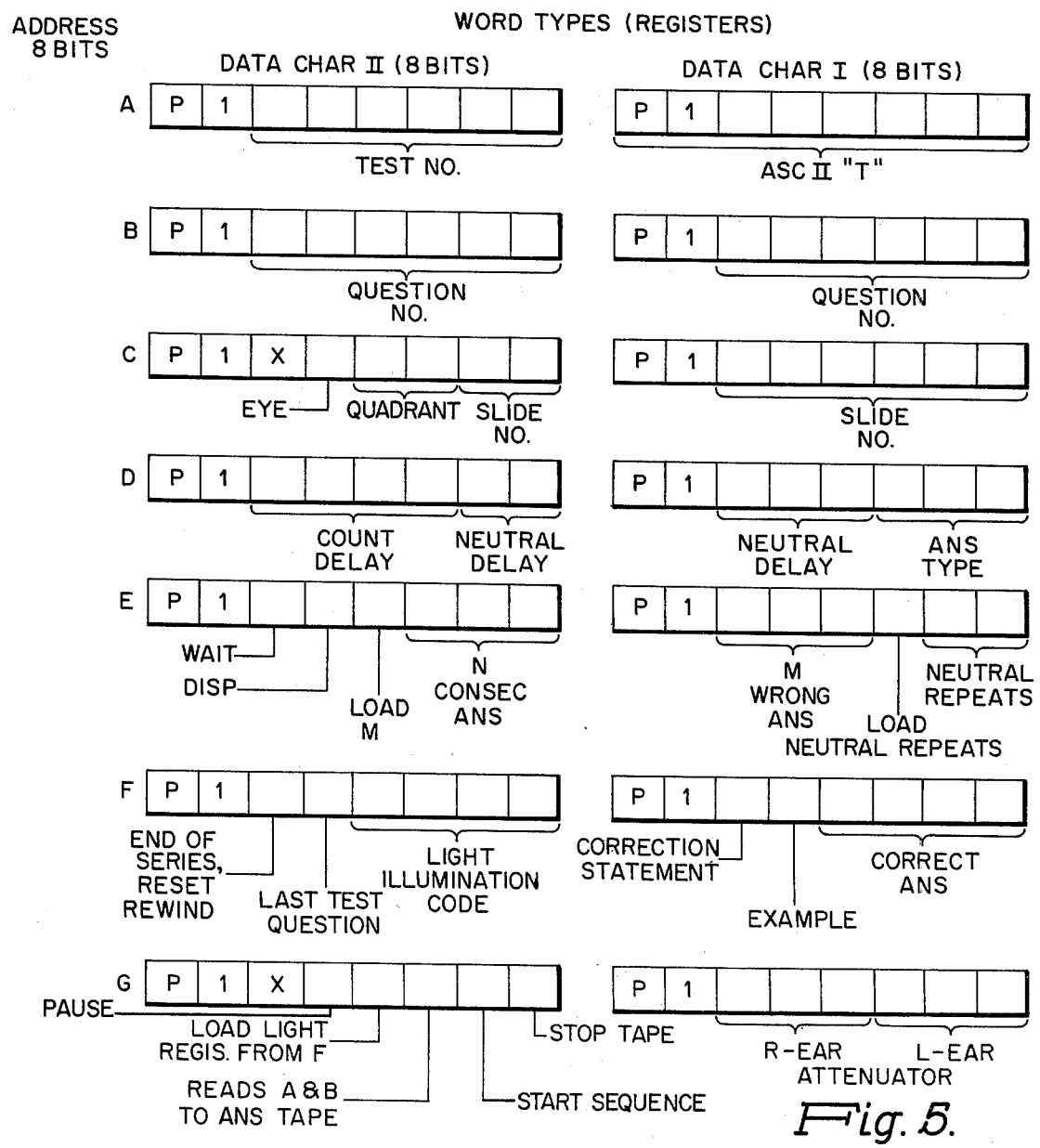
FIG. 5 is a diagram of contents of data word types and of corresponding data word registers used in the invention.
Figure 6:
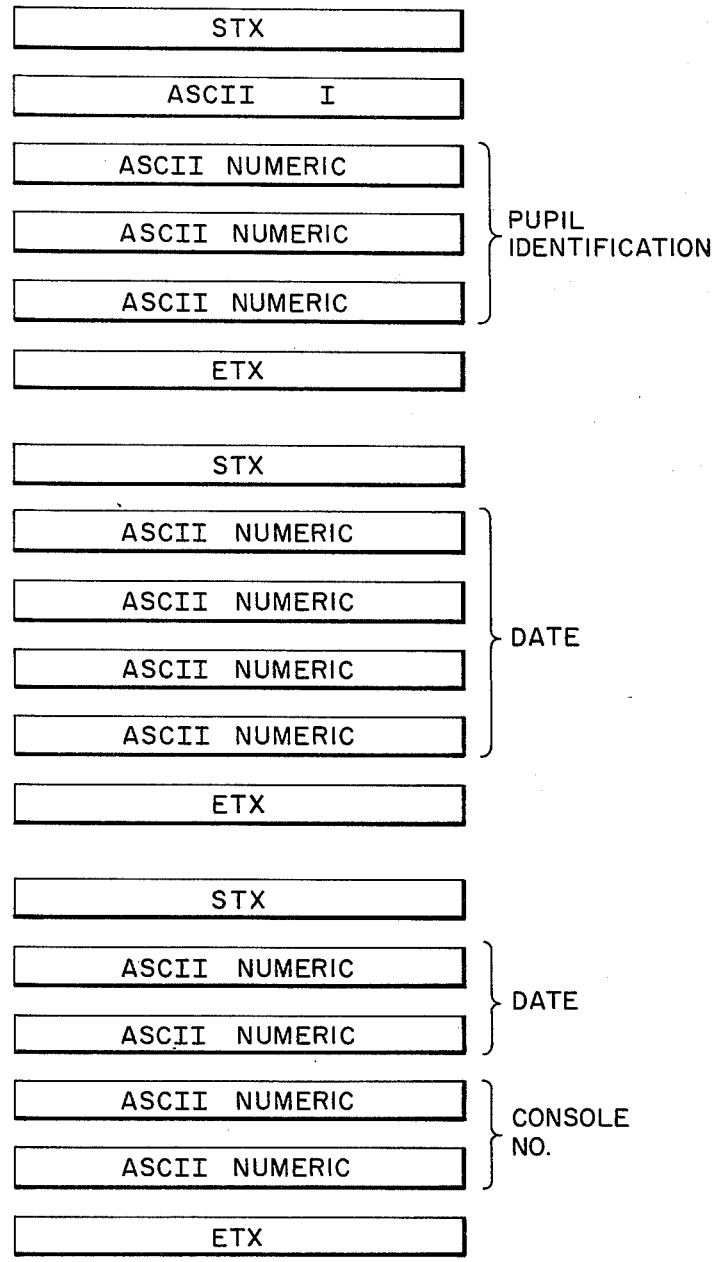

As shown in FIG. 5, the first word type A includes in the first character eight bits in ASCII for the designation T to indicate test. The second character indicates the test's number. The second word type B contains coding of the specific question number in the test in the first six bits of each of the two characters. In the C type word, the first six bits of the first character and the first two bits of the second character designate a slide number for the projection system of the screening console to be described below. The next two bits in the second character indicate which quadrant of the slide is to be displayed for the specific test question. The directly subsequent bit indicates which eye in a vision test is occluded. The sixth bit is unused. In the word type D, the first three bits of the first character designate the answer type which can include multiple button or counting answers. The next three bits of the first character and the first two bits of the second character designate a time interval magnitude which is termed a "neutral delay" and specifies the amount of time that the system will wait for the child to push a button before either activating the tape which provides an encouragement message to the child or going on to the next question. The last four bits of the second character indicate a similar time interval magnitude which is the time between button pushes in a count type of question which the system will wait before assuming that the child has pushed all that he is going to push. In word type E, the first two bits of the first character are a code indicating the number of times in a test sequence that the encouragement message will be given to the child. The next bit indicates that there has been a change in the number of encouragements and a corresponding register to be described below should be loaded. Alternatively, this load indication is employed to keep the register at full count for continuous use of the encouragement signal. The next three bits in the first character designate a quantity M which is the number of wrong answers in a sequence of N consecutive answers, coded in the first three bits of the second character, that will trigger an abort sequence automatically. The fourth bit in the second character loads the M designations into registers within the system. The next bit controls the display of the correct answer simultaneously with the presentation of a correction statement from the correction tape. It is a one if the correct answer is to be displayed, a zero otherwise. The last bit controls the waiting interval for the child to answer. If it is a one, the system will wait indefinitely for an answer while if it is a zero the system will proceed to the next question after the predetermined delays from register D. The F register for the F word type contains in the first four bits of the first character a code designating the correct answer for the particular question. The next bit is used to indicate whether the question presented is an example question and that correspondingly a wrong answer should not activate the answer tape. The final bit in the first character is set if a correction statement from a tape containing a sequence of correction statements is to be played in response to a wrong answer. In writing data onto the test tapes, correction statements are applied only for non-counting answers. The first four bits in the second character of the F register controls the bits for a light register to be described, one bit in each of the words corresponding to one of the illuminatable answer buttons 18 on the console controlled by the light register. The light control register is loaded from the F register by a control in the last or G word. The fifth bit in the second character of the F word is set to indicate that the question presented is the last in the test sequence before changing to a different test and the sixth bit indicates that the question is also the last question in the series of test sequences and activates the reset and rewind functions in the system to be described below after the question is answered. The final or G word contains in the first character digital separate controls for the volume in the earphones 24. The first three bits control the left ear and the next three bits control the right ear through an attenuator system to be described below. The first bit in the second character is a stop tape command which causes the test tape being played to stop as soon as the message is received in the G register (normally programmed by the user when all data for the next question has been entered and the audio message is complete). The second bit, when set, enables sensing of button pushes and the running of the neutral and the correction statement tapes, as well as the answer tape. The third bit enables the data in the A and B registers to be read to the answer tape. The fourth bit is a command which loads the code in the first four bits of the second character in register F into the light register. The fifth bit causes the pause light 38 to go on the system to stop before going on to the next question. The remaining bit is not needed for the present system. Typically, each of the registers A–G may be reloaded for each question on tapes 22A–22B.

To assist in further understanding the present invention, FIGS. 6–12 illustrate the message format for writing onto the answer and error tape 22E in FIG. 1. In particular, in FIG. 6, there is shown a three message set, each consisting of six characters which are read onto the answer tape whenever the enter button 32 is pressed. Each message begins with an STX and terminates with an ETX code as is standard. The first message in FIG. 6 has, in the first substantive character, the pupil identification code which is read from the thumbwheel switches 34. The second and third messages contain in the four characters of the second message, and in the first two of the third message, a code representing the setting of the calendar thumbwheel switches 42. The last two characters in the third message indicate a specific code number for the console.

Figure 7:
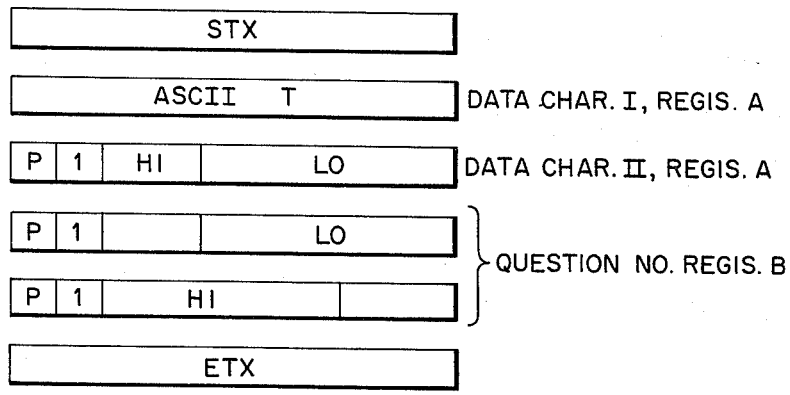

FIG. 7 shows the test number message and is read to the answer tape typically for each test. The first substantive character is a T designation as read from the A register, first character. The next character is the second character contained in the A register which typically indicates the test number. The next two characters are the first and second characters of the B register which will typically indicate the question number.

Figure 8:
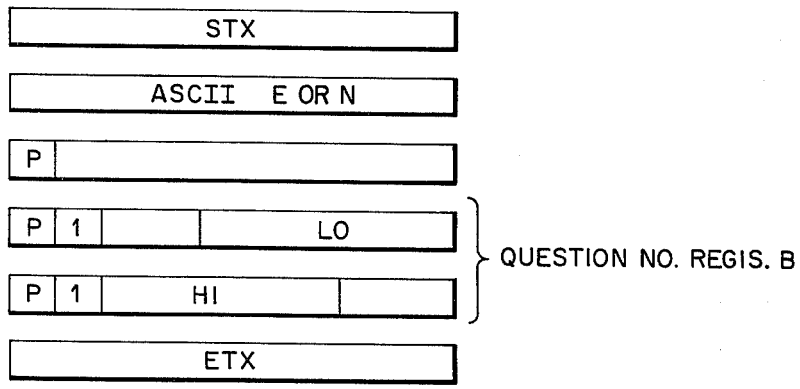

FIG. 8 is the test tape error message which is triggered whenever the system circuitry indicates that the data read from either test tape either contains unallowed codes or experiences uncorrectable errors. The error, as will be described below, is typically detected by providing each message four times on the test tape and correlating each of the four messages as they are read from tape. An error occurs if fewer than three of the four occurrences of any bit are identical. This error message of FIG. 8 contains in the first character a letter designating and identifying it as an error message. The next character is not utilized and the last two characters read the contents of the B register indicating the current question number.

Figure 9:
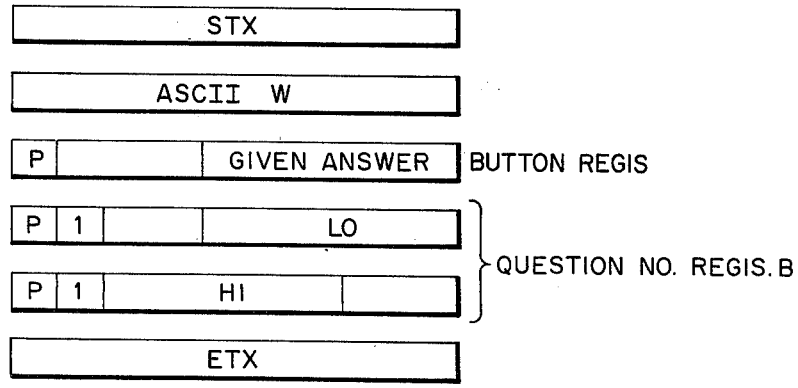

FIG. 9 is a message which is applied to the answer tape whenever a wrong answer is provided in response to a child pushing the wrong button or pushing the correct button the wrong number of times for counting questions. The first character indicates that it is a wrong answer message and is the character W. The next character contains the answer given by the child and the last two characters contain the register B designation for the question number.

FIG. 10 is the comment message which is applied to the answer tape whenever the comment button associated with the comment display 44 is depressed. The first character indicates the number setting of the thumbwheel switch 44. The second character is not utilized and the last two characters hold the register B question number.

FIG. 11 is the jump message and contains in the first character the J designation to identify it. The second character is not used and the last two characters read the register B question number. The jump message is generated whenever the button 46 in FIG. 2 is depressed.

FIG. 12 is the manual reset message which is applied to the answer tape whenever the operator activates the reset button 30 in FIG. 2. It contains in the first character the M identification. The second character is not used and the last two characters contain the question number from the register B.

Figure 13A:
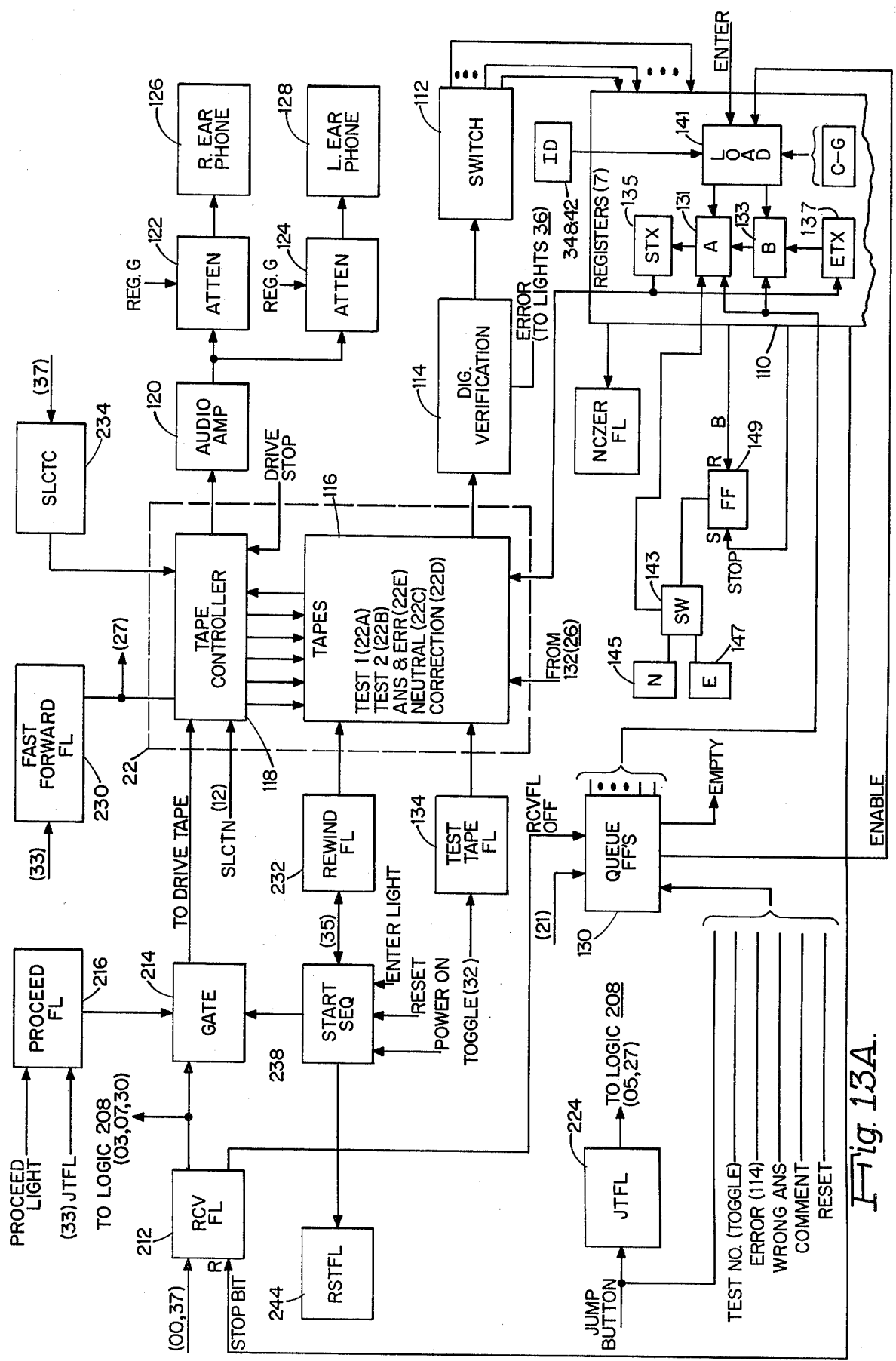
FIGS. 13A–13B are schematic diagrams of the logic structure functioning in the controller of the invention.
Figure 13B:
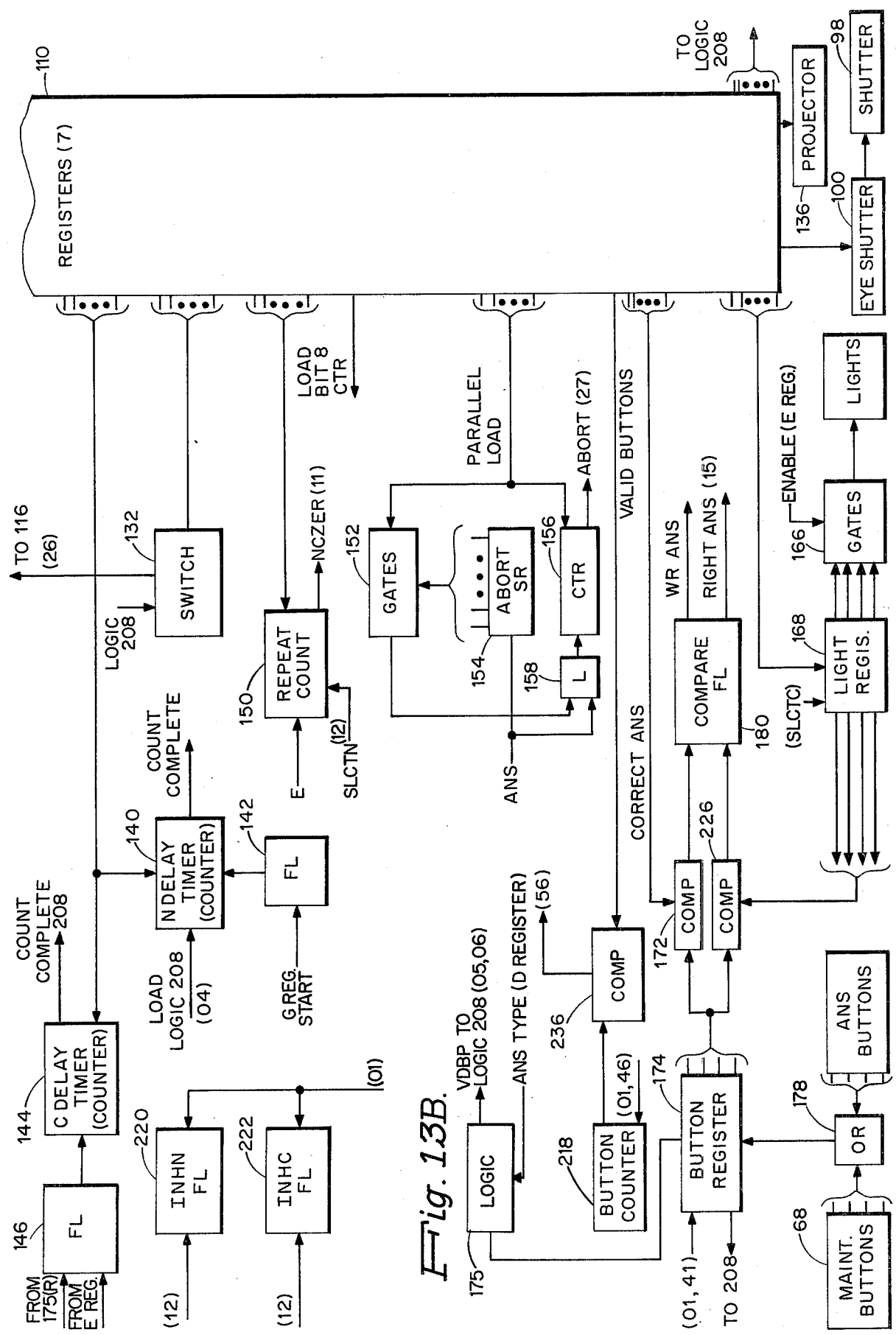
Figure 14:
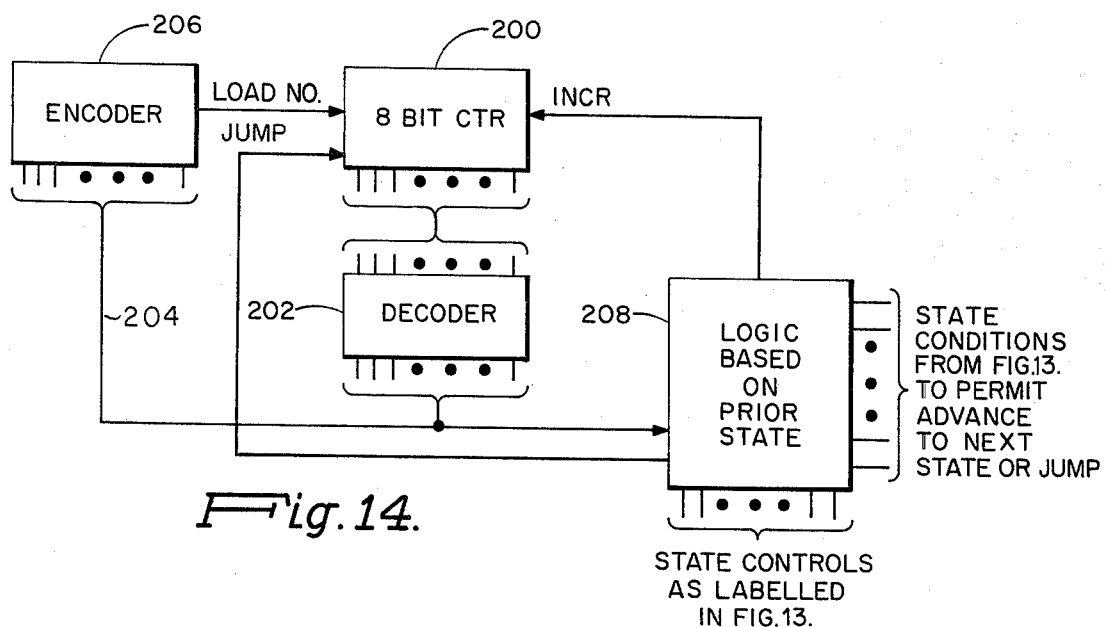
FIG. 14 is a schematic diagram of logic elements which provide sequence control of the various operations performed by the FIGS. 13A and 13B elements.

With reference now to FIGS. 13A, 13B and 14, the details of the control system 20 to provide the above-indicated operation are shown. FIGS. 13A and 13B illustrate logic circuitry employed to control system operation. The circuitry is in turn controlled by a sequence controller illustrated in FIG. 14 which cycles through a set of states, each producing a particular action by the logic of FIGS. 13A and 13B. Parenthetic numbers indicate the states pertinent to each logic circuit for input and output.

In FIG. 13A, a set of seven registers is provided in a register system 110, each register corresponding to the registers A, B, C, D, E, F and G described above with reference to FIG. 5. In a standard manner, data read from the tapes 22A or 22B is directed to one of the seven registers by a switch 112 which is operated in response to the address character in each of the seven possible words to set the switch 112 and direct the subsequent two characters to the corresponding register. In this manner, the registers are loaded with the appropriate control codes for controlling the operation of the remaining circuitry of FIGS. 13A and 13B. The input to the switch 112 is taken through a digital verification circuit 114 from the test tapes 22A or 22B. Each message is recorded four times on the tape. The digital verification circuit compares corresponding bits in the four recordings and provides an output indicating an error condition if any bit is not identical in at least three out of its four occurrences. In FIG. 13A, tape system 22 is shown to include the tapes 116, as well as a tape controller 118, all a part of the tape system 22. The tape controller 118 has provision to respond to the inputs shown in FIG. 13A to activate each of the five tapes independently for reading or in the case of the answer tape 22E for writing. The audio output from the test tapes 22A and 22B and from the neutral and correction statement tapes 22C and 22D is applied through the tape controller to an audio amplifier 120 and to separate digital attenuators 122 and 124 for application to the right and left earphones 126 and 128. The attenuators 122 and 124 are controlled by corresponding bit codes in the G register to establish predetermined attenuations for the hearing test.

The data written onto the answer tape 22E is provided from registers A and B which are controlled by a queue register 130, as well as a switch 132 (FIG. 13B) which reads from registers A and B in accordance with the messages of FIGS. 6–12 under a control from the sequence control circuitry of FIG. 14.

The particular one of the test tapes 22A and 22B which is enabled is controlled by a test tape flip-flop 134 which is toggled by a sequencer input to be described below in response to each test change.

The queue register 130 acts as a controller for the reading of data to the answer (and error) tape 22E and consists of a set of flip-flops for each of the messages in FIGS. 7–12 which is set when the conditions for that message exist. A priority network is used in the queue 130 to identify which message is to be sent if several flip-flops are set. The writing function occurs automatically whenever a flip-flop is set and an indication, explained below, is present that no other tape is being driven. This indication is provided by a RCVFL flip-flop 212. It may also be possible to activate the write function in between messages read from a tape.

Accordingly, each flip-flop in queue 130 is set by respective signals from the jump button, the G register A and B read bit and an error indication from verification circuit 114 directly act on the priority circuitry — a wrong answer indication explained below, activation of the comment button, and manual system reset. The queue 130 provides an empty indication when all of its flip-flops are off.

The mechanism for writing to the answer tape is illustrated in the register system 110 and employs the A and B shift registers 131 and 133 along with shift registers 135 and 137 which are provided with the ASCII codes for STX and ETX respectively. An enable comment from the queue 130 (a flop set and RCVFL not set) shifts data through shift registers 131, 133, 135 and 137 in a closed loop and the shifted data is simultaneously fed to the tape system 116.

The test No. message contains the contents of the A and B registers. For either messages, a load logic circuit 141 responds in the sequence priority to the highest priority message indication to load the A and B registers with the contents of registers C–G in accordance with the message, as identified in FIGS. 8–12, that is to be sent.

The ENTER button activates the load circuit 141 also to load the A and B registers 131 and 133 with the data from the thumbwheel switch 34 and 42.

The A register is loaded with the E or N designation for an error message from a switch 142 and fixed code circuits 145 and 147. Switch 143 is controlled by a flip-flop 149 that is set by a valid message filling the B register. In this manner, the E designation is in the error message when there is a valid B register message read after the last stop bit, and an N in the other case.

The tape register system 110 operates with specific FIGS. 13A and B registers and other circuits by providing digital information to them or controlling their operation. These circuits include a projector 136 which is typically an Eastman Kodak slide projector model RA 960. It is wired to receive the data from the C register in the first six bits of the first character and first four bits of the second character to control the slide and quadrant designation for presentation of the corresponding image. Similarly, the eye shutter control 100 is wired to the code in the fifth bit of the second character in the C register to designate which of the two eye channels in the vision hood 92 is to be occluded.

The first three bits of the first character in the D register indicate the answer type and operate with logic 175 described below. The next three bits, as well as the first two bits of the second character specifying the neutral delay, are applied for parallel loading of a delay timer counter 140 which commences counting a specified interval in response to a signal from a flip-flop 142 which, in turn, is activated by the second bit signal in the second character of the G register. Similarly, the count delay designating four bits of the second character in register D are applied for parallel loading into a delay timer 144 which is activated by a flip-flop 146 to commence the specified count period in response to a signal indicating a proper or valid button pulse as described below after each count button is pushed so as to time the delay to the next pushing of the count button. The first two bits of the E register designating the number of neutral repeats are loaded into a counter 150 to designate the number of repeats whenever the third bit in the first character of E register is set. The counter 150 decrements once each time a neutral message is run as is described below. The next three bits of the first character in the E register indicates the number of wrong answers M which can be tolerated in N consecutive answers before an abort. N is stored in the first three bits of the second character in the E register. These cooperate with a set of gates 152, abort shift register 154, a counter 156 and a logic circuit 158. The shift register 154 contains a number of positions corresponding to the maxiumum value for N and shifts the answer sequence through it. The gates are controlled by the N code in register E to respond to the answer sequence in the shift register 154 and select the code for the answer N questions before. This code is provided to the logic circuit 158 along with the current answer. The logic circuit 158 increments the counter 156 whenever the current answer and prior answer are respectively correct and incorrect, and decrements counter 156 whenever the current answer and prior answer are respectively incorrect and correct. In all other cases, the counter 156 is unaffected. When the counter 156 has decreased by the count of M loaded into it from the E register, an abort signal output is provided indicating that M wrong answers in N consecutive answers have been detected. The gates 152 decode the number N in register E and select the proper bit of the shift register 154 to gate the correct prior answer to the logic 158. The load M bit of the E register effectuates the loading of the counter 156 with the M designation from which it counts down to provide the output abort signal.

The fifth or display bit of the second character in the E register is applied as an enable control to a set of gates 166 which respond to the four bits of a light register 168 that, in turn, is loaded with the correct answer illumination code from the F register. The gates 166 are enabled by the display bit to activate the lights in the indicator buttons 18 in FIG. 1 from the light register 168 thereby illuminating the correct answer button. The actual control provided to the gates 166 is determined by the sequence control from FIG. 14 after testing the display bit in the E register as described below. The sixth (wait) bit in the E register is applied as a wait control for the timer 144 to complete its full counting of the predetermined interval for a neutral statement.

The four bit indication of the correct answer in the F register is applied to a digital comparator 172 along with the output of a button register 174 which responds through a set of OR gates 178 for each of the four answer bits. The OR gates 178 respond to corresponding buttons in the maintenance button set 70 on the FIG. 2 panel or the answer buttons 18 on the child's console to combine their signals. The digital comparator 172 provides an output to a compare flip-flop 180 to store an indication of either a wrong or right answer for use throughout the system as, for example, in application to the abort shift register 154 described above.

The four bits of the button register 174 are applied to a button register logic circuit 175 which receives the answer type code from the D register. Where one button is all that is to be pushed, an OR circuit is enabled to detect if at least one button is pushed. Where more buttons are to be pushed, a set of AND and OR logic determines that at least those many have been pushed. The output of logic 175, VDBP, identifies that the correct number have been pushed.

The example bit in the F register is applied to the FIG. 14 controller where it is detected during the sequence for the particular answer to prevent reading of an answer to the answer tape as described below. A correction statement bit in the F register is similarly detected by the FIG. 14 sequence controller to determine if the correction statement tape is to be played in response to a wrong answer.

The application of the illumination code in the second character of the F register has been described above and is referenced below. The last test question bits in the second character of the F register are also applied to the logic system of FIG. 14 and are tested in the sequence through which the circuitry steps on each answer and question.

The G register attenuator controls are, as indicated above, applied to control the digital attenuators 122 and 124 as by, for example, use of FET attenuator switches responsive to decoded G register values.

The first four bits of the second character of the G register control the indicated function directly. The fourth bit loads the light register 168 from the F register automatically, second character, first four bits. The third bit activates the queue 130 to read the A and B registers to the answer tape. The second bit activates the FIG. 14 circuitry to enter state 00 of the sequencing described below. The first bit is programmed to stop the tapes at the end of a message through the tape controller.

The remaining circuitry of FIG. 13 is best described in conjunction with the control sequence of the FIG. 14 circuitry. In FIG. 14 as can be seen, an eight bit counter 200 indicates one out of 64 states, each having a particular associated operation. The states of the counter 200 are applied to a decoder 202 which provides a state output on a line 204 to an encoder system 206 which establishes a predetermined next counter state to be loaded into counter 200 where that desired next state differs from the next sequential count state. A logic circuit controls counter 200 to either increment to the next sequential state or load the counter 200 with the output of the encoder 206. The logic system 208 responds to various signals in the FIG. 13 circuitry, as will be described below, and, in turn, provides various outputs to the FIG. 13 circuitry for enabling or controlling predetermined functions. The definition of the structure of the logic system 208 and encoder 206 is best seen in conjunction with the following table which identifies the states of the counter 200 and the conditions which are tested and the operations which result from each state.

Turning now to the step-by-step sequence of operations controlled by FIG. 14, reference is made to the following table:

TABLE

| STATE NO. | COUNT CONDITION | FUNCTION | LOAD CONDITION | BRANCH |
|---|---|---|---|---|
| 00 | START (G Reg. Bit) | Set RCVFL if PROCEED is Illuminated | 0 | |
| 01 | 1 | Clear Button Counter, Register & INHN, INHC FF's | 0 | |
| 02 | 1 | | BRZ/ | 01 |
| 03 | RCVFL/ | | 0 | |
| 04 | 1 | Load Neutral Delay | 0 | |
| 05 | Time EBIT14/+VDBP | | JTFL | 26 |
| 06 | 1 | | VDBP | 15 |
| 07 | RCVFL/ | | 0 | |
| 10 | 1 | | 0 | |
| 11 | 1 | Compare Button Register to Set Comparator Flip Flop (Count Mode.Light Buffer + Count Mode.Correct Ans.) | NCZER + INHN | 17 |
| 12 | 1 | Set SLCTN: Decrement Counter; Set INHN, INHC Set RCVFL | 0 | |
| 13 | 1 | | 0 | |
| 14 | 0 | | 1 | 03 |

TABLE-continued

| STATE NO. | COUNT CONDITION | FUNCTION | LOAD CONDITION | BRANCH |
|---|---|---|---|---|
| 15 | 1 | Compare Button Register to Set Comparator Flip Flop (Count Mode.Light Buffer + Count Mode. Correct Ans.) | Compare | 45 |
| 16 | 1 | | FBIT6 IHNC/ (Correct) | 36 |
| 17 | 1 | | FBIT5 (Example) | 26 |
| 20 | 1 | | 0 | |
| 21 | 1 | Set Wrong Ans. Queue Flip-Flop | 0 | |
| 22 | 1 | | 0 | |
| 23 | 1 | | FBIT5 (Example) | 26 |
| 24 | 1 | | 0 | |
| 25 | 1 | Update Abort | 0 | |
| 26 | All Queue Flip-Flops to Off | | 0 | |
| 27 | Fast Forward FL OFF | | JTFL/FBIT13/ ABORT/ | 00 |
| 30 | RCVFL/ | | 0 | |
| 31 | 1 | | FBIT14 (Reset) | 35 |
| 32 | 1 | Change Test Tape NO. | 0 | |
| 33 | 0 | Set Fast Forward FL; Reset JTFL, Reset Proceed if JTFL | All Queue Flip-Flops OFF | 00 |
| 34 | 1 | | 0 | |
| 35 | X | Rewind; Reset | 1 | 00 |
| 36 | RCVFL/ | | 0 | |
| 37 | 1 | Set SLCTC: Set Light Register To Correct Ans.; Set RCVFL, INHC | 0 | |
| 40 | 1 | | 0 | |
| 41 | 1 | Clear Button Register | 0 | |
| 42 | 1 | | BRZ/ | 41 |
| 43 | 0 | | 1 | 03 |
| 44 | 1 | | 0 | |
| 45 | 1 | | Count Mode | 23 |
| 46 | 1 | Load Timer 144; Incr. Button Counter 218 | 0 | |
| 47 | 1 | Clear Button Register | Time Or Counter To 15 | 56 |
| 50 | 1 | | 0 | |
| 51 | 1 | | BRZ/ | 47 |
| 52 | 1 | Load Timer | 0 | |
| 53 | Time Or VDBP | | 0 | |
| 54 | 1 | | 0 | |
| 55 | 1 | Compare Button Register To Light Buffer | Compare | 46 |
| 56 | 1 | Compare Button Counter 212 To Correct Ans. in Registers 110 | Compare | 23 |
| 57 | X | | 1 | 17 |

The following discussion will best be understood by reference to the individual steps of each state listed in the table above. The particular steps in the table are designed to control the operation for all the functions described above in conjunction with control data shifted into the shift register system 110 in FIG. 13. The table has beside each state number three condition or function columns and a final column of branch states to which the system is stepped if the conditions for branching are met. The first of the three columns is a count condition which identifies a condition necessary before counting of counter 200 can proceed beyond that state to the next sequential state. The second column lists the functions which are accomplished in the state and the third column indicates the conditions for determining whether counter 200 is loaded to the encoder 206 state to branch to the state in the last column. If both the count and load conditions are met, the load function takes precedence.

From this background, the function controlled by the FIG. 14 circuitry in conjunction with specific elements of FIG. 13 circuitry will now be described with relation to the above table. The state 00 is in the initial step. The count condition requires that the G register bit in character 2, bit 2, be present. The function of the 00 step is to set a flip-flop 212 in FIG. 13, identified as the RCVFL. This flip-flop operates through a gate 214, that is controlled by a proceed flip-flop 216 to activate the tape controller 118 to run the test tapes 22A or 22B in accordance with the setting of the flip-flop 134. The proceed flip-flop 216 is activated by a signal from the proceed indicator-button 40 in FIG. 2, as well as by other signals from the logic unit 208. There is no branch condition in state 00 and state 01 is automatically entered. State 01 has no count condition and proceeds to its function which is to automatically clear the button register 174, as well as a button counter 218 and two flip-flops 220 and 222 identified respectively as the INHNFL and INHCFL flip-flops. The processing continues from state 01 directly into state 02 where a branch condition tests the output of the button register 174 to determine whether a button has been pushed which would prevent the clearing of the register in state 01. If the button register has not been cleared, processing branches to state 01 and attempts to clear again but otherwise continues to state 03 which tests the RCVFL flip-flop 212 for reset as the count condition. The flip-flop 212 is reset by the presence of the stop tape bit in the G register and accordingly state 03 is maintained until that register receives the stop indication from data read from the tape. Sequencing then continues without a count condition or function to state 04 which has the function of loading the neutral delay number into the counter 140 from the D register. Processing then automatically continues to state 05 which has a count condition the presence of a count complete signal from the timer 140 in conjunction with the absence of the wait bit in the E register or the generation of a valid button push signal (VDBP) from the logic circut 175 acting on button register 174. The branch condition in state 05 tests a flip-flop 224 designated JTFL which is set by the jump button 45 in FIG. 2 to indicate a jump.

If the flip-flop 224 is set, branching is to state 26, otherwise sequencing counts to state 06 where the branch condition depends upon the status of the VDBP signal from the logic circuit 175. If this signal is present, branching is to state 115 and, if absent, sequencing continues to state 07 where the RCVFL flip-flop 212 is tested as the count condition causing a delay until a tape stop signal is received in the correspondng G register bit. Sequencing continues (in octal notation) through state 10, which is empty, to state 11 where the answer type bits of the D register are tested to determine the answer mode. If the indication is not that the question represents a count mode question (i.e. the child being asked to push a lighted button the correct number of times), the comparator 172 is activated so that the actual button push can be compared to the correct answer in register F and set the compare flip-flop 180 accordingly.

If a count mode is indicated by the D register, the button register 174 contents, and the output of light register 168, are compared by a comparator 226 to determine if the child has pushed the right button and set the flip-flop 180 accordingly. A branch to state 17 occurs on the condition that either the repeat counter 150 at its output (NCFER) indicates that the neutral statement should not be read again because of a predetermined number of repeats having occurred, or if the INHN flip-flop 220 is set indicating that the neutral counter is to be inhibited. Otherwise, sequencing continues to state 12 where the function is to set the tape controller to select the neutral tape with the instruction identified as SLCTN, to decrement the repeat counter 150 one count, to set the INHN flip-flop 220, as well as the INHC flip-flop 222, and to set the RCVFL flip-flop 212 to begin running of the neutral 22C test tape. Setting of the flip-flops 220 and 222 causes an inhibition of the neutral or correction statements in the sequence as described elsewhere. Processing continues through state 13 to state 14 which has a forced branch returning to state 03.

It will be recalled that state 15 is entered from state 06 under the condition of a valid button push indication from circuit 175 (VDBP). In state 15, the contents of the button register 168 in a count mode or the contents of the correct answer portion of the F register for a non-count mode set the compare flip-flop 180 accordingly as indicated above for step 11. If the right answer is indicated by the flip-flop 180, the sequence branches to state 45. In state 45, there is a branch condition to state 23 if not in a count mode. In state 23, there is a branch condition to state 26 if the example bit in the F register is set to indicate the presence of an example question. Assuming that it is non-example question, sequencing continues through spare state 24 to state 25 which updates the abort counter 156, for a correct answer. Normal sequencing will then continue to state 26 which is also entered for an example question which did not update the abort counter. In the state 26, the queue register 130 is tested for an empty signal indicating that the answer tape has been written with all the messages indicated by the queue register 130. When this count condition is satisfied, counting continues to state 27. As indicated above, the answer tape is run automatically by the tape controller in response to a signal from the queue register 130 whenever there is data in it, but processing must stop at state 26 until there is an indication that the queue 130 is empty. In state 27, a count occurs on the condition that a fast forward flip-flop 230 is reset. The flip-flop 230 controls the tape controller 118 for stepping the not-used test tape 22A or 22B to the next test sequence and is reset by it reaching that position. Branching is to state 00 if the JTFL flip-flop 224, the last test question bit in the F register, and the abort counter 156 are not set. Otherwise, processing continues to state 30 upon fulfilling the count condition.

The count condition in state 30 is that the RCVFL flip-flop 212 is reset indicating that neither test tape is running and when satisfied leads directly to state 31 which has a branch condition depending on the setting of the reset bit of the F register in the last data position of the second character. If this bit is set indicating an end of all testing, branching is to state 35. Otherwise, sequencing continues to state 32 which provides a signal to the test tape flip-flop 134 to toggle it, thereby instructing the tape controller to play the next or different tape. Sequencing then continues to state 33 which sets the fast forward flip-flop 230 to fast drive causing the other test tape that has now become the inactive one, but was the previous source of audio and data, to be driven ahead to the next test. The JTFL flip-flop 224 is reset and the proceed flip-flop 216 is reset if the JTFL flip-flop 224 had been set. A branch condition in state 33 tests the queue register 130 and, if empty, branches to state 00. State 33 continues until this condition is satisfied. State 34 is a spare.

The function of state 35, reached from state 31 at the end of testing, is to rewind all tapes through operation of a rewind flip-flop 232 and to provide reset signals throughout the system. Branching is automatic to state 00.

Assume that in state 11 the conditions for playing of a neutral statement did not exist and that state 17 is entered. In state 17, the branch condition is the presence of the example bit in the F register. If it is set processing continues to state 26 as indicated above, otherwise passes through spare state 20 to state 21, which sets the wrong answer designation into the queue register 130 for reading onto the answer tape 22E. Subsequent state 22 is empty and leads to state 23 described above.

Assume now that state 16 is entered from state 15 through the indication of a wrong answer. In state 16, a branch condition tests the correction statement bit in the F register to indicate whether a correction statement is to be played. If the bit is present and the INHC flip-flop 222 has not been set, branching is to state 36. In state 36, a count condition is the resetting of the RCVFL flip-flop indicating that the tape stop signal has been received in the G register. Counting is to state 37, which functions to set an SLCTC flip-flop 234 which instructs the tape controller 118 to select the correction tape 22D for playing and further sets the light register 168 to the correct answer from the F register, sets the RCVFL flip-flop so that the correction statement tape is activated and sets the INHC flip-flop to prevent rerunning of the correction tape in later processing. The correction tape will automatically be stopped by the presence of a data instruction to load the G register with the stop tape bit at the end of the correction statement on the correction tape as also will the neutral statement tape. From state 37, processing continues through spare state 40 to state 41 which functions to clear the button register 174 and continues through state 42 which has a branch condition dependent upon the clearing of the button register to loop processing back through state 41 to insure that the button register will be cleared. As indicated above, failure to clear the button register might result from a child being in the process of pushing a button. From state 42, if the button register has been cleared, processing leads to state 43 which has a forced ranching to state 03.

State 46 is entered from state 45 if the determination in the state 45 branch condition in testing the answer type bits of B register is that the question represents a counting mode. At this point, it will be recalled that the child has pushed the correct button so state 46 operates to load the delay timer 144 with count delay data from the D register and to increment the button counter 218 with each count in response to the child's answer. In state 47, the button register is cleared and the branch condition tests for the count complete signals from the delay timer 144 or a fifteen count in the button counter 218 to branch to state 56. Otherwise, processing continues through spare state 50 and state 51 which has a looped branch condition with state 47 for clearing of the button register. Once the button register is cleared, processing continues to state 52 which loads the delay timer 144 again from the D register for the next interval and continues to state 53. State 53 has a count condition based upon the expiration of time in the delay timer 144 or the indication of a valid button push from the button register logic 175. When this interval has passed or a valid button push is received, processing continues through state 54, which is spare, to state 55 which activates a comparator 226. If the right button has been pushed, processing continues to state 46 to repeat the above sequence for a subsequent button push. If the wrong button has been pushed in state 55, processing continues in state 56 which compares the state of button counter 218 to the correct answer in a comparator 236 and provides a branch condition test of the comparator output. If the correct number of pushes has occurred sequencing proceeds to state 23 whereas if incorrect, proceeds in sequence to state 57 which branches automatically to state 17 for the wrong answer sequence.

Figure 15:
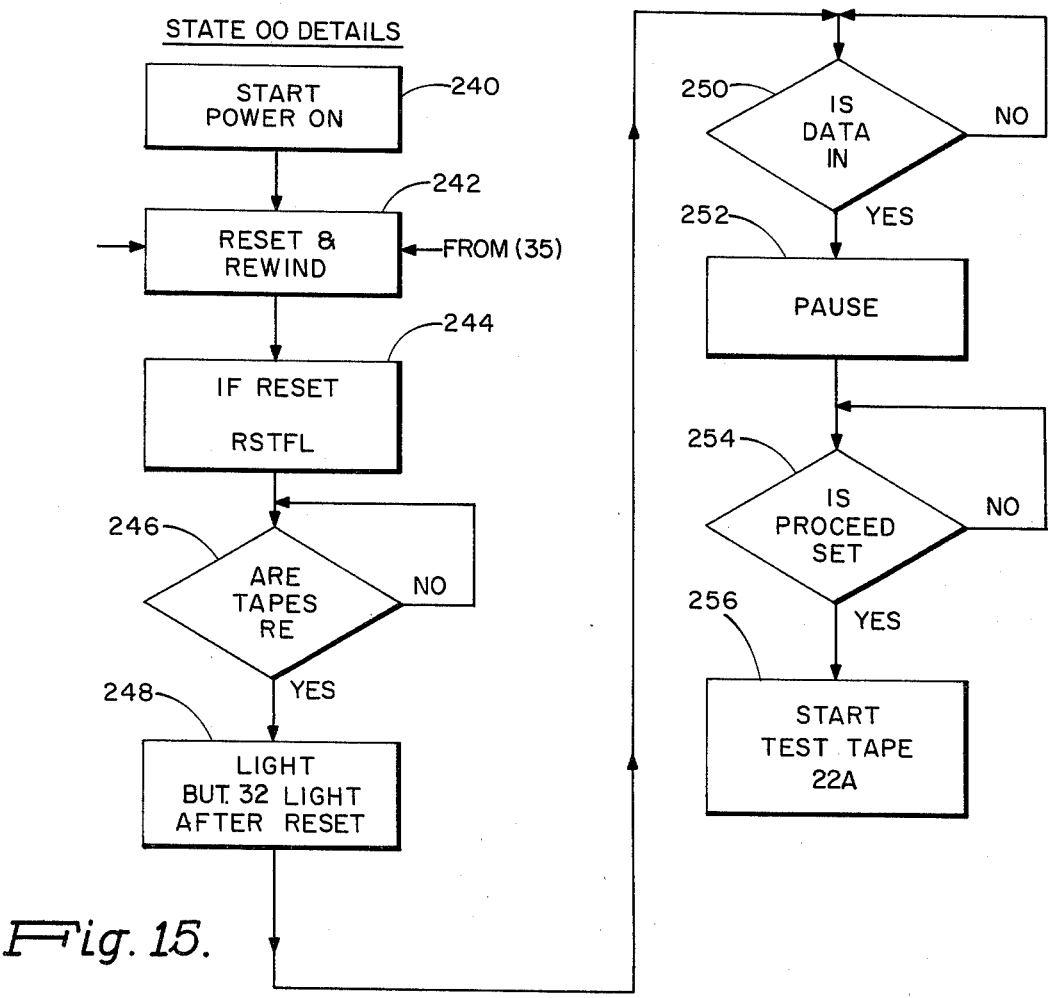
FIG. 15 is a chart of system turn-on steps of FIGS. 13A and 13B elements.

With reference to FIG. 15, there is disclosed an operative flow chart for the operation of a start sequence controller 238, shown in FIG. 13A, which controls the gate 214 as the initial turn-on procedure for the child tester. With reference to FIG. 15, sequencer 238 begins from a power-on state 240 through a reset and rewind state 242 which resets the circuits and rewinds all the tapes through flip-flop 232. Reset and rewind step 242 is also entered from state 35 of the sequence counter 220. A subsequent step 242 sets a reset flip-flop 244 (RSTFL) which, in turn, activates the reset light 30. A subsequent decision 246 test for rewinding of the tapes and loops with itself until an indication from the tape system 116 is received that all tapes have been reset. At this point, a step 248 lights the enter indicator button 32. After button 32 is pressed, a test 250 waits until all data associated with depression of the ENTER indicator button 32 has been entered on the score and answer tape 22E. A subsequent step 252 is a pause which is entered automatically but which can be excited in response to activation of the pause button 38. A subsequent step 254 loops with itself to detect activation of the proceed indicator button 40 which then permits proceeding to an operation 256 to commence driving of the first test tape 22A for the test sequence.

Having described above the preferred embodiment according to the present invention, it will occur to those skilled in the art that alternatives and modifications can be made without departing from the spirit of the invention. It is accordingly intended to limit the scope of the invention only as indicated in the following claims.

What is claimed is:

1. An audio-visual system for presenting a sequence of questions having selectable correct and incorrect answers to a person for detecting possible learning handicaps, said system comprising:
    an audio-visual station having a portion for viewing a sequence of visual information and a portion for listening to a sequence of associated audio information;
    said audio and visual information providing said questions having the selectable answers;
    means for presenting a sequence of visual information and associated audio information to said person at said audio-visual station;
    person activatable means by which an answer selected by said person to presented audio-visual information may be indicated to said system;
    means for detecting any of a plurality of abnormal responses by said person to presented audio-visual information including means for detecting a failure by said person to indicate an answer selection within a predetermined time interval and means for detecting an incorrect answer selection; and
    means operative upon detection of an abnormal response and operative in association with said presenting means for altering the sequence of presentation of the visual and associated audio information in accordance with characteristics of the detected abnormal response, including means for providing encouragement information to said person in response to detection of a failure by said person to indicate an answer selection after said predetermined time interval, and means for causing the presentation of an indication of a correct answer upon detection of an incorrect answer.

2. The audio-visual system of claim 1 further including register means for controlling the presentation of a correct response individually for each question in the sequence of presented visual and audio information.

3. The audio-visual system of claim 1 wherein:
    said means for detecting abnormal responses includes means for detecting a predetermined number of abnormal responses within a predetermined number of presented questions and answers in the visual and associated audio information; and
    said means for altering said presentation includes means for presenting as the next visual and audio information, information representing a question and answers a predetermined position ahead in said sequence.

4. The audio-visual system of claim 1 further including register means for generating a special signal for recording by said recording means to represent separate provision of a comment pertinent at that point in the question sequence.

5. An audio-visual system for presenting a sequence of questions having selectable correct and incorrect answers to a person for detecting possible learning handicaps, said system comprising:
- an audio-visual station having a portion for viewing a sequence of visual information and a portion for listening to a sequence of associated audio information;
- said audio and visual information providing said questions having the selectable answers;
- means for presenting a sequence of visual information and associated audio information to said person at said audio-visual station;
- person activatable means by which an answer selected by said person to presented audio-visual information may be indicated to said system, wherein at least one question is of a type for which a correct answer requires plural activations of said person activatable means;
- means for detecting any of a plurality of abnormal responses by said person to presented audio-visual information including means for detecting passage of a predetermined interval between each activation of said person activatable means; and
- means operative upon detection of an abnormal response and operative in associatin with said presenting means for altering the sequence of presentation of the visual and associated audio information in accordance with characteristics of the detected abnormal response.

6. An audio-visual system for presenting a sequence of questions having selectable correction and incorrect answers to a person for detecting possible learning handicaps, said system comprising:
- an audio-visual station having a portion for viewing a sequence of visual information and a portion for listening to a sequence of associated audio information;
- said audio and visual information providing said questions having the selectable answers;
- means for presenting a sequence of visual information and associated audio information to said person at said audio visual station;
- person activatable means by which an answer selected by said person to presented audio-visual information may be indicated to said system;
- means for detecting any of a plurality of abnormal responses by said person to presented audio-visual information;
- means operative upon detection of an abnormal response and operative in association with said presenting means for altering the sequence of presentation of the visual and associated audio information in accordance with characteristics of the detected abnormal response;
- an optical system through which the person views said visual portion through separate lenses for each eye; and
- means responsive to predetermined questions in the question sequence for selectively preventing viewing through one of the separate lenses for each eye thereby to permit analysis of vision difficulties in the person answering the question sequence.

7. An audio-visual system for presenting a sequence of questions having correct and incorrect answers to a child, said system comprising:
- an audio-visual station having a viewing screen and associated projection means for displaying on said viewing screen a selected image from a set of images, and further having respective audio sources for each year of the children being questioned;
- said audio-visual station having a plurality of response selection buttons for the child to indicate an answer;
- sequentially readable record medium storing a plurality of digital signals and associated audio signals representing the sequence of questions;
- means for reading from the record medium the stored digital and associated audio signals to control said projection means to display for each question in the question sequence a corresponding image on said viewing screen and to control said audio sources to present the audio signals stored on said record medium for the associated question;
- means for sensing child actuation of said response button;
- means operative in association with said means for sensing button actuation for detecting each of a predetermined set of a plurality of groups of child failures to respond normally to each presented image and associated audio signals including a group comprising failures by said child to indicate an answer selection within a predetermined time interval, and a group comprising incorrect answer selections;
- means for altering the predetermined sequence of presented images and audio signals to present preselected different information in correspondence with the group of the particular child failure detected; and
- means for providing encouragement information to said person in response to detection of a failure by said person to indicate an answer selection after said predetermined time interval; and
- means for causing the presentation of an indication of a correct answer upon detection of an incorrect answer.

8. An audio-visual system for screening of persons to detect possible learning handicaps comprising:
- an audio-visual station having a portion for viewing visual information and a portion for hearing audio information;
- a record medium system having control information and audio recorded thereon in groups, each group corresponding to a question in a question sequence;
- means for scanning a selected portion of said record medium system to detect the corresponding recorded control and audio information;
- means responsive to the detected control information for operating said viewing portion to display corresponding visual information on sad viewing portion;
- means responsive to the detected audio information for applying the audio signals to the hearing portion of said audio-visual station;
- means by which a person may indicate an answer to the questions corresponding to the group of visual and audio information to provide an answer signal;

means responsive to said answer signal to enable scanning of a further selected portion of said record medium system;

said record medium system having thereon audio information for indicating that an answer signal is an incorrect answer signal;

said record medium system further having data recorded thereon in association with each control information to provide an indication of a correct answer signal;

means for determining whether an answer signal is a correct answer signal in response to detected data from said record medium system;

means responsive to an incorrect answer signal for providing a record thereof on said record medium system;

means for applying the audio information indicative of an incorrect answer signal to said hearing portion;

means responsive to the data indicative of the incorrect answer signal for indicating in association with said visual portion the correct answer when the incorrect answer signal is detected;

said record medium system having recorded thereon audio information which provides an encouragement message;

means responsive to the passage of a predetermined interval without an answer signal for applying the encouragement message audio information on said record medium system to the hearing portion of said audio-visual station;

a viewing hood through which the visual portion is viewed through separate lenses for each eye;

means for selectively blocking the view through each lens in response to a signal; and means responsive to predetermined characteristics in the detected control information for selectively enabling said lens blocking means.

9. An audio-visual system for screening of persons to detect possible learning handicaps comprising:

an audio-visual station having a portion for viewing visual information and a portion for hearing audio information;

a record medium system having control information and audio recorded thereon in groups, each group corresponding to a question in a question sequence;

means for scanning a selected portion of said record medium system to detect the corresponding recorded control and audio information;

means responsive to the detected control information for operating said viewing portion to display corresponding visual information on said viewing portion;

means responsive to the detected audio information for applying te audio signals to the hearing portion of said audio visual station;

means by which a person may indicate an answer to the questions corresponding to the group of visual and audio information to provide an answer signal;

means responsive to said answer signal to enable scanning of a further selected portion of said record medium system;

said record medium system having thereon audio information for indicating that an answer signal is an incorrect answer signal;

said record medium system further having data recorded thereon in association with each control information to provide an indication of a correct answer signal;

means for determining whether an answer signal is a correct answer signal in response to detected data from said record medium system;

means responsive to an incorrect answer signal for providing a record thereof on said record medium system;

means for applying the audio information indicative of an incorrect answer signal to said hearing portion;

means responsive to the data indicative of the incorrect answer signal for indicating in association with said visual portion the correct answer when the incorrect answer signal is detected;

said record medium system having recorded thereon audio information which provides an encouragement message; and means responsive to the passage of a predetermined interval without an answer signal for applying the encouragement message audio information on sad record medium system to the hearing portion of said audio-visual station.

10. The system of claim 9 wherein:

said hearing portion includes respective earphones for left and right ears; and register means are provided responsive to predetermined characteristics in detected control information for varying the level of sound provided by each of said earphones.

11. The system of claim 9 further including:

an answer signal counter; and register means responsive to predetermined characteristics in said detected control information to count the number of consecutive answer signals associated with the display of selected visual information.

12. The system of claim 9 wherein:

said record medium system includes at least one magnetic tape;

a plurality of storage registers are provided;

means are provided for transferring detected control information from said record medium to said storage registers;

means are provided to operate in response to data stored in said registers to cause the display of corresponding visual information on said viewing portion.

13. An audio-visual system for screening of persons to detect possible learning handicaps comprising:

an audio-visual station having a portion for viewing visual information and a portion for hearing audio information a record medium system including first and second magnetic tapes each aving a plurality of groups of control information, each group corresponding to a question in a question sequence, each sequence being divided into test sets and also having audio information recorded thereon in groups to provide for a sequence of visual information display and associated audio information at said audio-visual station;

means provided for positioning one of said first and second magnetic tapes at a point for the detection of the beginning of the next test set during use of the other of said first and second magnetic tapes for the current sequence of control and audio information;

means for scanning a selected portion of said record medium system to detect the corresponding recorded control and audio information;

means responsive to the detected control information for operating said viewing portion to display corresponding visual information on said viewing portion;

means responsive to the detected audio information for applying the audio signals to the hearing portion of said audio-visual station;

means by which a person may indicate an answer to the questions corresponding to the group of visual and audio information to provide an answer signal;

means responsive to said answer signal to enable scanning of a further selected portion of said record medium system;

said record medium system having thereon audio information for indicating that an answer signal is an incorrect answer signal;

said record medium system further having data recorded thereon in associatin with each control information to provide an indication of a correct answer signal;

means for determining whether an answer signal is a correct answer signal in response to detected data from said record medium system;

means responsive to an incorrect answer signal for providing a record thereof on said record medium system;

means for applying the audio information indicative of an incorrect answer signal to said hearing portion;

means responsive to the data indicative of the incorrect answer signal for indicating in association with said visual portion the correct answer when the incorrect answer signal is detected;

said record medium system having recorded thereon audio information which provides an encouragement meassage; and means responsive to the passage of a predetermined interval without a answer signal for applying the encouragement message audio information on said record medium system to the hearing portion of said audio-visual station.

14. The system of claim 13 further including:

means responsive to the indication of correct answer signals in said control information and the actual answer signals four counting the number of incorrect answer signals;

means responsive to predetermined characteristics in detected control information indicative of a predetermined number of incorrect answer signals within a predetermined number of questions presented as corresponding groups of visual and audio information for determining when that predetermined number of incorrect answer signals has been exceeded; and means responsive to a determination that the predetermined number has been exceeded for scanning subsequently the other of said first and second tapes thereby advancing the question sequence to the next test set.

* * * * *